United States Patent Office 3,530,960
Patented Sept. 29, 1970

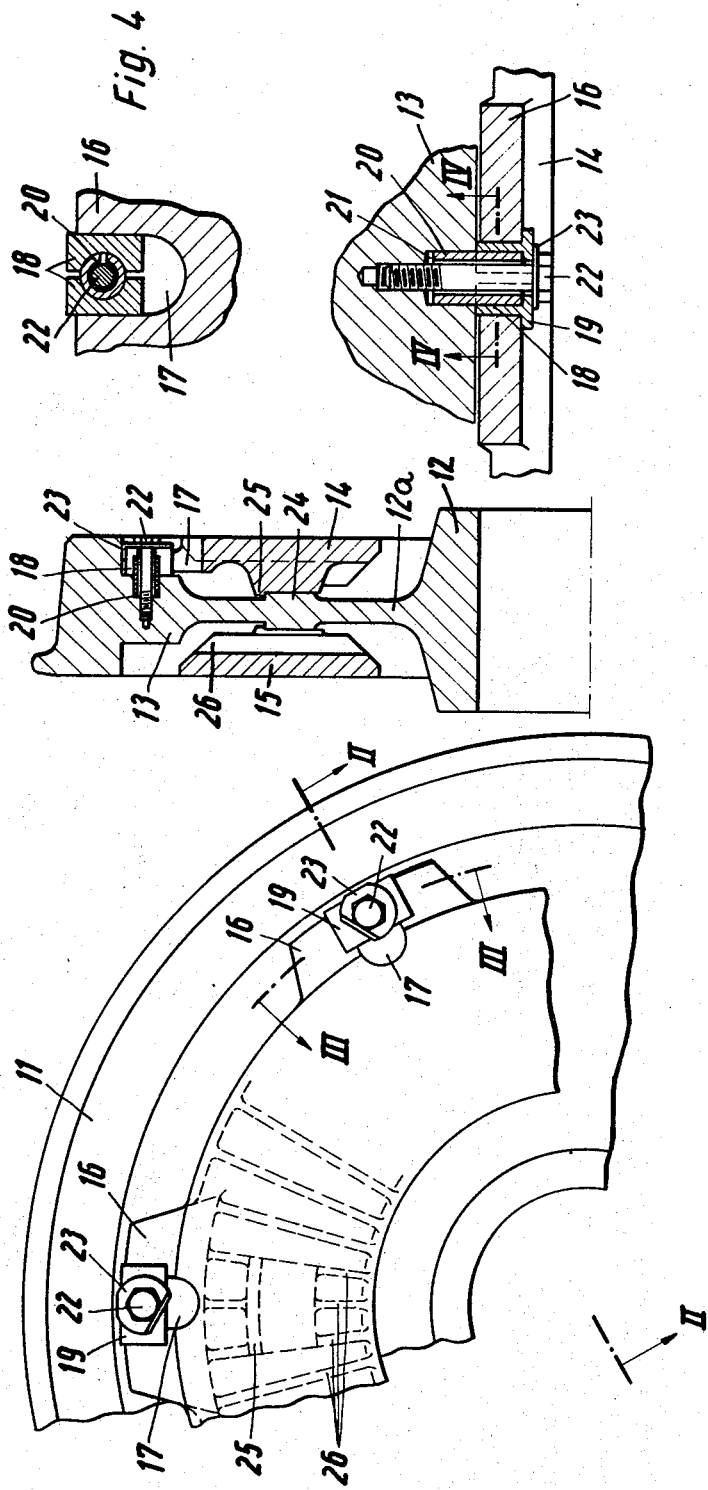

3,530,960
WHEEL AND BRAKE CONSTRUCTION
Alfred Otto and Manfred Gronemann, Remscheid, Germany, assignors to Bergische Stahl-Industrie, Remscheid, Germany
Filed Feb. 28, 1969, Ser. No. 803,147
Claims priority, application Germany, Mar. 15, 1968, 1,680,379
Int. Cl. F16d 65/12
U.S. Cl. 188—218                                10 Claims

ABSTRACT OF THE DISCLOSURE

A wheel for rail vehicles includes a hub surrounded by a radially extending disk portion. A pair of annular brake members each overlie one axial side of the disk portion and are provided with circumferentially spaced radial projections. A radial cutout is provided in each projection and a split insert including at least two sections is received in each of the cutouts. A plurality of expansion members is provided each rigid with the disk portion and each having a part received in one of the cutouts surrounded by the sections of the respective split insert so that, when the respective expansion member is expanded, the sections of the split insert are clamped between it and the walls bounding the respective cutout to thereby connect the brake members with the hub.

BACKGROUND OF THE INVENTION

The present invention relates generally to wheel constructions, and more particularly to wheel constructions wherein a hub carries at opposite axial sides annular brake members. Still more particularly the invention relates to the construction of a wheel for rail vehicles.

It is known to construct wheels for rail vehicles by providing a hub with a radially extending disk portion surrounding it and by securing at opposite axial sides of this disk portion annular brake members. For this purpose it is known to utilize screws which serve to connect the brake members either with the hub itself or with the root of the disk portion where the same joins the hub. Of course, to effect such a connection it is necessary to drill into or through the root so that the screws can be threaded into these bores. This, evidently, has a certain disadvantage because the provision of bores in the material which is in these regions particularly highly stressed, brings forth that the danger that cracks or fissures may develop. Moreover, without disassembling the brake members from the hub, which term here identifies also the disk portion, it is impossible to check the wheel to determine whether such cracks or fissures have indeed developed.

Because of the obvious problems resulting from this type of construction it has been suggested to secure the brake members with the hub without any need for providing bores in the hub or in the root of the disk portion of the hub. The problem with this construction, however, resides in the fact that the hub must be made from steel casting to provide it with the necessary ability to yield whereas the brake members must be made from material which has good frictional characteristics but does not yield significantly so that differential yielding, for instance differential thermal expansion, leads to difficulties.

SUMMARY OF THE INVENTION

The present invention has as its general object to overcome the aforementioned problems.

A more particular object of the present invention is to provide a wheel construction of the type under discussion wherein it is not necessary to bore through or into any part of the hub or the disk portion associated therewith in order to connect the annular brake members with the hub.

An additional object of the invention is to provide such a wheel construction which is lighter in weight than heretofore possible.

A concomitant object of the invention is to provide a wheel construction of the type under discussion wherein the connection between the disk portion of the hub and the brake members undergoes very little wear.

In pursuance of the above objects, and others which will become apparent hereafter, one feature of our invention resides in the provision of a wheel, particularly the type used in rail vehicles, having a combination which comprises a hub provided with a radially extending disk portion having opposite axial sides and a pair of annular brake members each overlying one of these axial sides and each being provided with a plurality of circumferentially spaced radial projections. Each of the projections is provided with a radial cutout and a split insert including at least two sections is received in each of these cutouts.

Finally, we provide a plurality of expansion members each of which is rigid with the disk portion and each of which has a part received in one of the cutouts surrounded by the sections of the respective split insert whereby the sections are clamped between the aforementioned part and the walls bounding the respective cutout in response to expansion of the expansion member so as to connect the brake members with the hub.

The novel features which are considered as characteristic for the invention are set forth in particular in the appended claims. The invention itself, however, both as to its construction and its method of operation, together with additional objects and advantages thereof, will be best undersood from the following description of specific embodiments when read in connection with the accompanying drawing.

BRIEF DESCRIPTION OF THE DRAWING

FIG. 1 is a fragmentary axial elevation of a wheel according to the present invention;

FIG. 2 is a section taken on the line II—II of FIG. 1;

FIG. 3 is a section taken on the line III—III of FIG. 1; and

FIG. 4 is a section taken on the line IV—IV of FIG. 3.

DESCRIPTION OF THE PREFERRED EMBODIMENTS

Discussing now the drawing in detail it will be seen that the wheel according to our present invention is generally identified with reference numeral 11. It comprises a supporting structure including a hub portion 12 and a radially extending disk portion 12a which surrounds the hub portion and has opposite axial sides. This is shown more clearly in FIG. 2 wherein only one half of the wheel is shown, it being understood that the half which has been omitted is mirror-symmetrical with respect to the one shown.

The outer circumference or margin of the disk portion 12a is provided with a circumferentially extending axially projecting bead 13. Annular brake members 14 and 15 overlie the opposite axial sides of the disk portion 12a and are provided at their radially outwardly located margin with circumferentially spaced projections 16 of any desired number.

As FIGS. 1 and 4 show most clearly, each of the projections 16 is provided with a radially extending cutout 17 and each such cutout accommodates the sections of a split insert 18. In the illustrated embodiment the split insert 18 is assumed to consist of two sections as most clearly seen in FIG. 4 and these sections are provided with an abutment shoulder 19 which overlies that axially outer surface of the respective brake member 14 or 15 which faces away from the disk portion 12a. This is most clearly visible in FIG. 3.

Located within the confines of the two sections of the split insert 18 is a portion of an expansion member, here identified as an expansion sleeve 20 (compare FIGS. 2–4) and radial expansion of the expansion sleeve 20 causes the same to move into engagement with the sections of the split insert 18 and to deflect these away from each other into engagement with the walls bounding the cutout 17 so that considerable stresses are set up between these walls and the expansion sleeve 20 through the intermediary of the sections of the split insert 18, thereby reliably and firmly connecting the respective brake members 14 and 15 with the disk portion 12a.

A screw 22 serves to connect each of the inserts 18 and expansion sleeves 20—and thereby the respective brake members 14 and 15— with the disk portion 12a. As shown most clearly in FIG. 2 the screw extends into a bore provided in the bead or enlarged portion 13 in the outer marginal zone of the disk portion 12a.

We have found it to be advantageous if the expansion sleeves 20 extend in part into bores provided in the disk portion 12a, and more specifically in the bead 13 provided on the disk portion 12a.

A locking member 23 of sheet metal, well known per se to those skilled in the art, prevents undesired or accidental loosening of the screws 22. A small circumferentially extending enlarged portion 24 is located substantially in the middle of the disk portion 12a (compare FIG. 2) and centering projections 25 provided on those surfaces of the brake members 14 and 15 which face towards the disk portion 12a engage this enlarged portion 24 and serve to maintain the brake members 14 and 15 concentric with respect to the disk portion 12a and the hub 12. In known manner the sides of the brake members 14 and 15 which face towards the disk portion 12a are provided with a plurality of substantially radially extending cooling ribs 26.

It will be appreciated that by connecting the brake members 14 and 15 with the disk portion 12a in the manner just outlined the smallest possible forces will be exerted upon the projections 16 and the inserts 18 when braking takes place; the reason for this is that the connecting points are moved far radially outwardly relative to the gravitational center of the annular braking members. Braking forces acting upon the annular braking members are therefore reliably transmitted by the expansion members 20 to the disk portion 12a and the screws 22 are required to transmit no braking forces at all but serve only for axially securing the braking members 14 and 15 against movement.

The pre-tension acting on the expansion members 20 is significantly higher than the brake forces which act thereon so that they cannot undergo compression as a result of braking forces but rather will always serve to reliably press the sections of the sleeves 18 against the surrounding walls bounding the respective cutouts 17. On the other hand the force with which they effect this pressure is not so great that a shifting of the projections 16 or the slots 17 with respect to the inserts 18 would be completely impossible in the event that the annular brake members 14 and 15 should be heated with consequent thermal expansion during a braking incident. This is the main consideration behind the present invention that this be possible with the type of connection provided according to the invention.

While the annular braking members 14 and 15 are fixed with respect to the disk portion 12a as far as concentricity is concerned, they have freedom of expansion in radial direction in the event that they undergo thermal expansion. Furthermore, the provision of the split inserts 18 and the expansion members 20 located between the sections of the split inserts 18 under pressure serves to compensate for wear and tear which may take place between the inserts 18 and the walls of the cutouts 17 in which they are received. Of course, such wear and tear will be rather small because the area pressure at the points of contact of the split sleeves 18 with the surrounding walls bounding the cutouts 17 is quite small so that wear and tear will be minimal.

It will be understood that each of the elements described above, or two or more together, may also find a useful application in other types of constructions differing from the types described above.

While the invention has been illustrated and described as embodied in a wheel which is particularly suited for rail vehicles, it is not intended to be limited to the details shown, since various modifications and structural changes may be made without departing in any way from the spirit of the present invention.

We claim:

1. In a wheel, particularly for rail vehicles, a combination comprising a hub provided with a radially extending disk portion having opposite axial sides; a pair of annular brake members each overlying one of said axial sides and each being provided with a plurality of circumferentially spaced radial projections having respective radially directed edges; a radial cutout provided in and extending inwardly from the respective edges; and connecting means comprising a plurality of split inserts each including at least two sections and being received in one of said cut-outs, and a plurality of expansion members each rigid with said disk portion and each having a part received in one of said cut-outs and surrounded by said sections of the respective split insert and operative for expanding said sections and clamping the same between said part and the walls bounding the respective cut-out for securing said brake members to said disk portion against axial movement of the former relative to the latter while permitting limited radial displacement of said projection relative to said disk portion in response to thermal expansion of said brake members.

2. In a wheel as defined in claim 1, wherein said expansion members are expansion sleeves.

3. In a wheel as defined in claim 1, said disk portion being provided with a plurality of bores, and each of said expansion members having an additional part extening into one of said bores and rigidly secured therewithin.

4. In a wheel as defined in claim 1, said projections each having an axial surface facing axially away from said disk portion; and wherein said inserts are each provided with an abutment shoulder overlying said axial surface of the respective brake member.

5. In a wheel as defined in claim 1, said hub and said brake members consisting of metallic material.

6. In a wheel as defined in claim 1; and further comprising a plurality of screws each extending through one of said expansion members into said disk portions and rigidly connecting the former with the latter.

7. In a wheel as defined in claim 6; and further comprising locking means engaging said screws and operative for locking the same against undesired loosening.

8. In a wheel as defined in claim 1, said disk portion and said annular brake members being respectively provided with cooperating centering portions engaging one another and maintaining said brake members concentric with reference to said disk portion.

9. In a wheel as defined in claim 8, said disk member having a free marginal zone provided with a circumferentially extending axially projecting bead, and said brake members each having an inner surface facing towards said disk portion and provided thereon with centering projections engaging with said bead.

10. In a wheel as defined in claim 9; further comprising a plurality of radially extending cooling ribs provided on the inner surfaces of said brake members,

References Cited
FOREIGN PATENTS

| | | |
|---|---|---|
| 1,151,830 | 7/1963 | Germany. |
| 775,237 | 5/1957 | Great Britain. |
| 186,827 | 12/1963 | Sweden. |

GEORGE E. A. HALVOSA, Primary Examiner

U.S. Cl. X.R.

192—107